United States Patent [19]
Howard

[11] Patent Number: 6,097,374
[45] Date of Patent: Aug. 1, 2000

[54] WRIST-PENDENT WIRELESS OPTICAL KEYBOARD

[76] Inventor: Robert Bruce Howard, 5208 Sudley Rd., Manassas, Va. 20109

[21] Appl. No.: 09/035,983

[22] Filed: Mar. 6, 1998

Related U.S. Application Data

[60] Provisional application No. 60/040,502, Mar. 6, 1997.

[51] Int. Cl.[7] .................................................. G09G 5/00
[52] U.S. Cl. ............................................ 345/168; 345/157
[58] Field of Search ..................................... 345/156, 157, 345/158, 173, 174, 175, 168, 169; 340/20, 22

[56] References Cited

U.S. PATENT DOCUMENTS

| | | | |
|---|---|---|---|
| 4,578,674 | 3/1986 | Baker et al. ............................. | 340/710 |
| 4,836,778 | 6/1989 | Baumrind et al. ........................ | 433/69 |
| 4,954,817 | 9/1990 | Levine .................................... | 345/156 |
| 4,988,981 | 1/1991 | Zimmerman et al. .................. | 345/156 |
| 5,198,877 | 3/1993 | Schulz .................................... | 356/375 |
| 5,414,413 | 5/1995 | Tamaru et al. .......................... | 345/175 |
| 5,555,894 | 9/1996 | Doyama et al. ........................ | 345/156 |
| 5,605,406 | 2/1997 | Bowen .................................... | 400/472 |
| 5,616,078 | 4/1997 | Oh .......................................... | 463/8 |
| 5,646,648 | 7/1997 | Bertram .................................. | 345/168 |
| 5,707,160 | 1/1998 | Bowen .................................... | 400/472 |
| 5,726,685 | 3/1998 | Kuth et al. .............................. | 345/173 |
| 5,796,354 | 8/1998 | Cartabian et al. ...................... | 345/157 |
| 5,880,712 | 3/1999 | Goldman ................................ | 345/168 |
| 5,914,704 | 6/1999 | Yamada et al. ......................... | 345/157 |

*Primary Examiner*—Xiao Wu
*Attorney, Agent, or Firm*—Irah H. Donner; Hale and Dorr LLP

[57] ABSTRACT

A method and apparatus is provided for sensing, encoding and transmitting electronic keyboard data, pointing device control signals and voice input. The apparatus includes a wireless device appended, for example, to each wrist of the operator. The wireless device utilizes an optical reflectance matrix detecting key closures, an inertial motion sensor encoding pointing device commands and sound acquisition circuit, all of whose signals are optionally multiplexed and broadcast at, for example, radio frequency or wireless to a local base station connected to the computer-based host system. The optical reflectance matrix includes a plurality of infrared LED's or other light sources sequentially illuminating columns in a plane below the palm of the user's hand, from which reflections from the user's fingers are detected along rows with a plurality of sensors such as phototransistors. The optical plane is penetrated by the user's extended fingers (or other obstructions), in an "air typing" action. Hand motion is sensed with two dimensional accelerometers and encoded to generate a pointing device control signal. Acoustic signals are optionally acquired in an on-board audio system which also provides sound feedback transmitted from the base station for two-way voice communications and to confirm input.

27 Claims, 9 Drawing Sheets

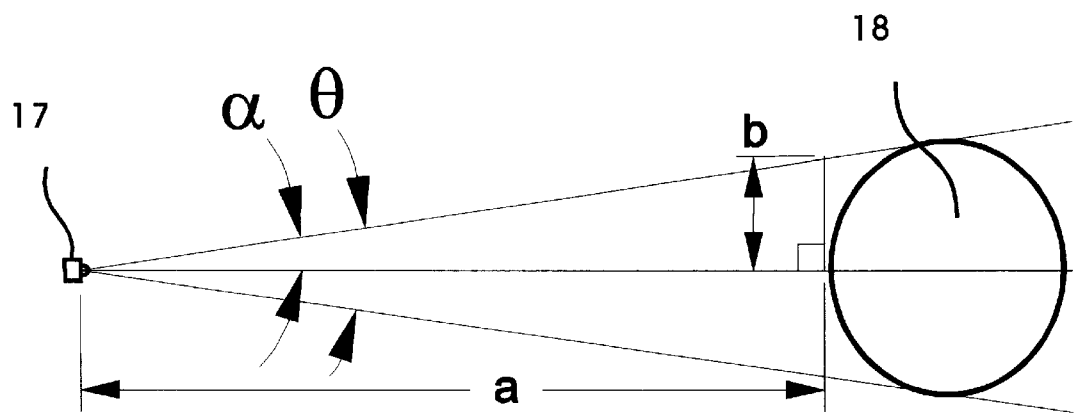
FIG. 5a
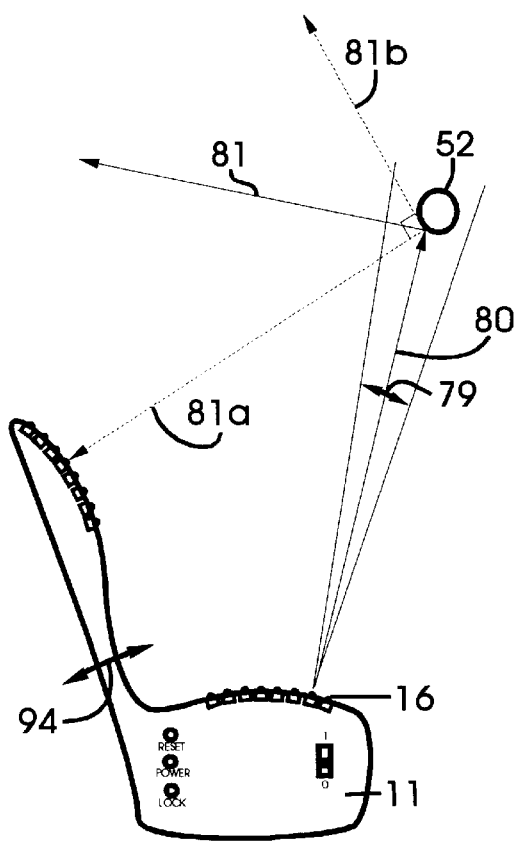
FIG. 5b
FIG. 5

FIG 8a. Inertial Reference Pointing Mechanism

FIG 8b. Gravity Reference Pointing Mechanism

WRIST-PENDENT WIRELESS OPTICAL KEYBOARD

RELATED APPLICATIONS

This patent application claims priority from U.S. provisional patent application No. 60/040,502, filed Mar. 6, 1997, incorporated herein by reference.

BACKGROUND OF THE INVENTION

1. Field of the Invention

The present invention relates generally to the field of human-machine interface for input of control and data signals, and more specifically to keyboard and pointing device input to a computer-based host for data processing, process control or musical instrument applications.

2. State of the Prior Art

The field of keyboard and pointing device electronic signal input has traditionally focused on physical keyboard, mouse or joystick devices with relatively fixed position in close proximity to the host system. As electronic computing, process control and communication devices become increasingly integrated into daily routine, a more flexible interface device is sought. Non-mobile devices constrain the user to the location and ergonomic position consistent with device operation, which may cause deleterious long term effects including repetitive motion syndrome, user fatigue, muscular tension or other discomfort. Ergonomically designed devices offer limited improvement since location and position are still relatively fixed.

Computer operation, machine control, electronic mail and digital voice communication are essential to an increasing populace in the workplace as well as personal daily life. Such activities tether the operator to the appropriate device, often for protracted periods of time, reducing productivity and ultimately limiting the usefulness of these media. Workers are routinely located at telephones, computers, industrial control consoles, etc. for the majority of the work day. Other activities are often interrupted while the user enters information or communication into a computer or automated telephone menu system. Wireless and portable technology such as cell phones and notebook computers increase flexibility with which activities are accomplished, but a user interface relies upon restrictive physical devices.

Telephone keypads offer a limited number of keys, while notebook and palmtop computers, personal organizers and handheld calculators exhibit cumbersome ergonomic attributes including inconvenient size and device placement constraints. The device must often be placed on a supporting surface or held while in use. Miniature devices utilize keyboards so small that they sometimes require a stylus to depress the keys. These type devices burden the user with virtually full attention directed toward the operation of the device.

Voice recognition input devices demand considerable computing power and limit the speed with which input is accepted and processed.

SUMMARY OF THE INVENTION

Accordingly, it is the general object of this invention to provide an efficient and unobstructive system for sensing individual finger position and hand motion without restricting operator location or orientation, to detect keyboard and/or parametric control input, and transmit via wireless link corresponding electronic signals optionally along with two-way audio communications to a computer-based host system.

A more specific object of the present invention is to provide, with a minimum of intrusion to other activities, a mobile and ergonomic method and apparatus for simultaneous typing, cursor pointing, parametric control and acoustic audio input, to a computer based data processing or communication system, while providing audio and optionally video feedback from the system. A flexible input device results from the ability to switch quickly between cursor movement, pointing and typing, or simultaneously engage the keyboard and parametric control for drawing or musical synthesis while the operator is untethered to any non-mobile fixture. The wrist-pendant device offers an ergonomic design conducive to extended periods of operation by permitting movement and adjustment of position optical matrix geometry to alleviate excessive repetition of motion. The invention applies to data entry and communications during field activities in hostile environments (underwater, gaseous or smoky environments) including military, medical and space applications.

An additional objective of the present invention is data entry, parametric control and communications at extended distances from the host system by modem connection to the public switched telephone network via a standard telephone interface in the base station, or direct satellite transceiver link in the master wrist-pendant device using, for example, the master/slave configuration illustrated in FIG. 9, using a cellular phone network or the like.

Another objective of the present invention is to provide a method and apparatus for playing music by means of keyboard operation with optional simultaneous control of volume, pitch, timbre, sound effects or other parametric control variables. Untethered operation frees the musician during the performance of such music for logistical organization of related activities (e.g. light show) and comprehensive expression in theatric bodily motion or dance.

Optical sensing of the user's fingers provides for computer interface with minimal obstruction of the hands, allowing the operator to multiplex computer interface with other activities. The adjustable optical sensor array tracks the natural position of the hands independently, allowing flexibility of operator position and orientation. Wireless, untethered operation affords freedom of operator location while maintaining real time input and feedback to the user. An optional head mounted display brings the host system's video screen to the mobile user, completely freeing the user from restrictions in proximity to the host system, while still allowing a powerful, networked host with high storage capacity and peripheral access including specialty plug-in devices. Operator fatigue and the detrimental effects of repetitive motion is mitigated.

The devices are dynamically controllable and the keys may be remapped as desired for alternate operation. A single hand may optionally have access to the whole keyboard by selecting the other hand's keys during momentary "shifted" configuration. The opposing hand may be translated as a user would move the hand across a keyboard or folded over to preserve digit order in the key map. The keys may be remapped to a ten-key configuration for calculator or telephone type operation. Special functions and commands may be utilized as desired.

Audible feedback may be desirable in certain applications to confirm receipt of the input. The source of the audible feedback is optionally selectable from the host computer's audio system, the base station's audio system or the wrist unit's audio system and may include a click, beep or voice statement of the parameter or command issued. Examples of typical operations include computer click to verify virtual keyboard key closure, variable frequency tone to establish setting or change of an analog level, or voice statement of alphanumeric received. Voice statement of inputs or messages enhance use by a visually impaired operator.

BRIEF DESCRIPTION OF THE DRAWINGS

FIGS. 5a–5b are detailed diagrams of the optical beam cell matrix geometry.

DETAILED DESCRIPTION OF THE PREFERRED EMBODIMENTS

Figure 1:
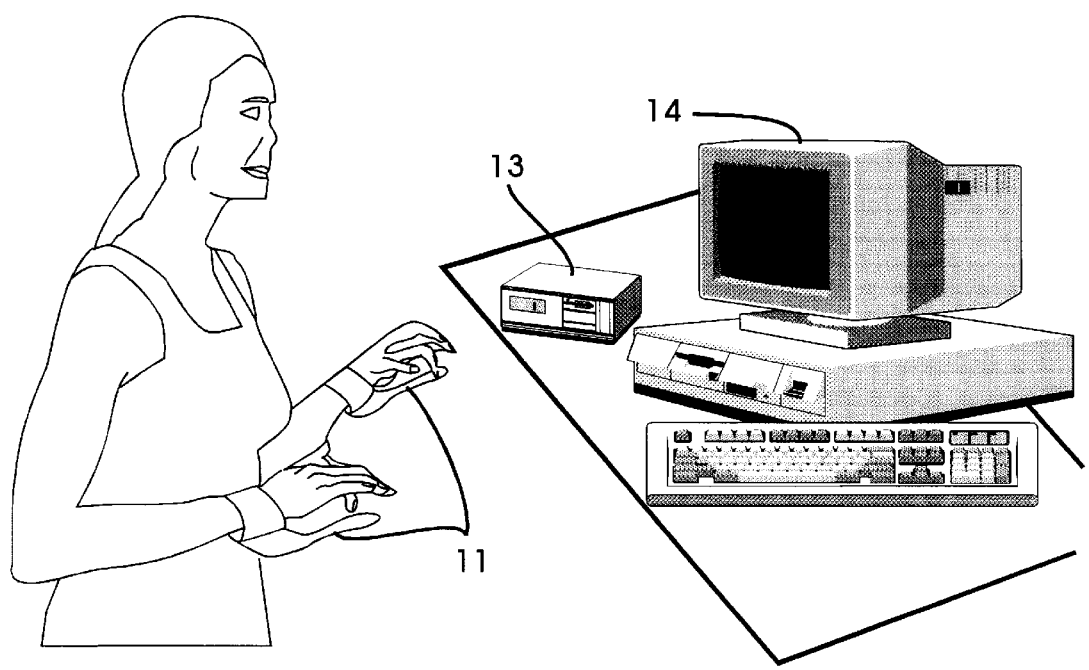
FIG. 1 is a perspective view of the wrist-pendant optical keyboard system according to the present invention in use with a personal computer.
Figure 6:
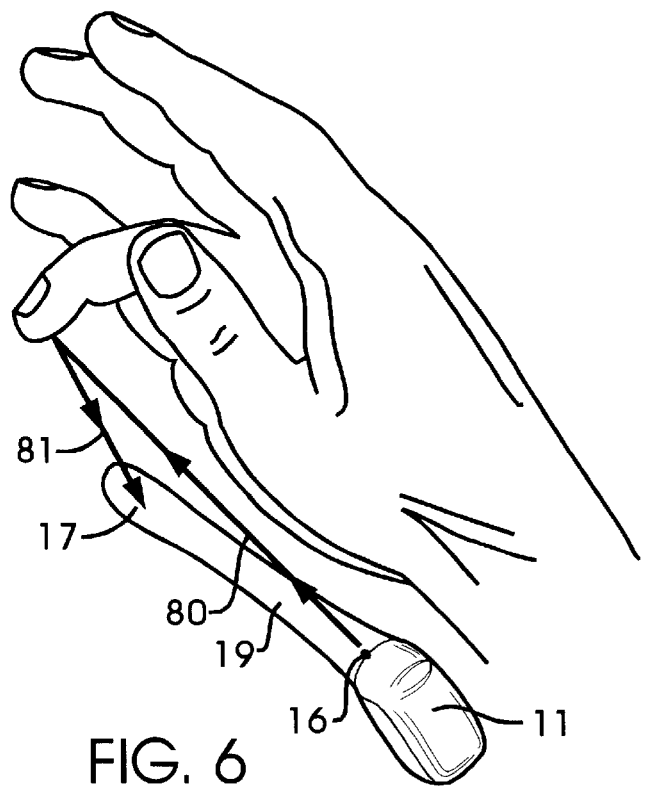
FIG. 6 is a perspective view illustrating a ring finger key closure.
Figure 7:
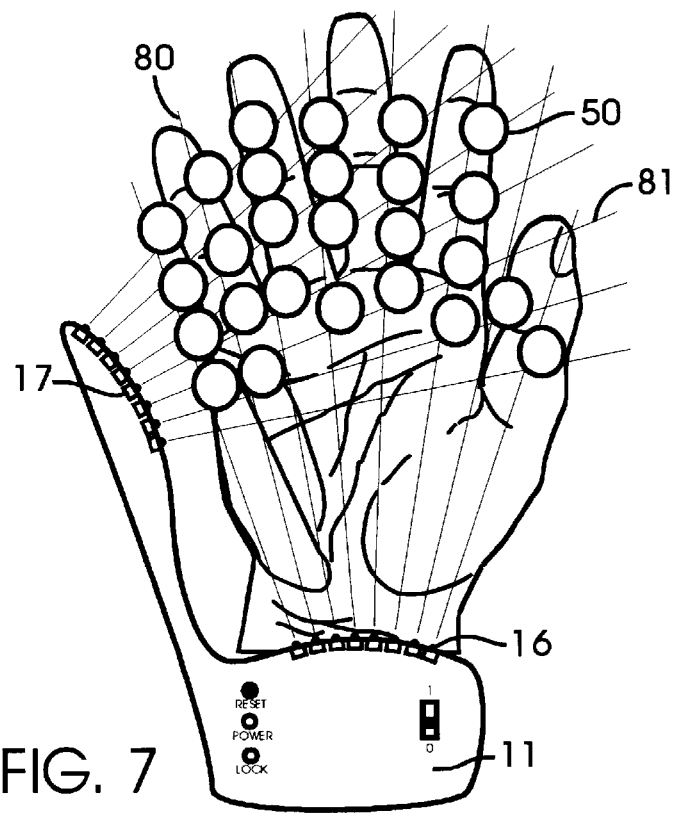
FIG. 7 is a diagram of the optical cell location.
Figure 11:
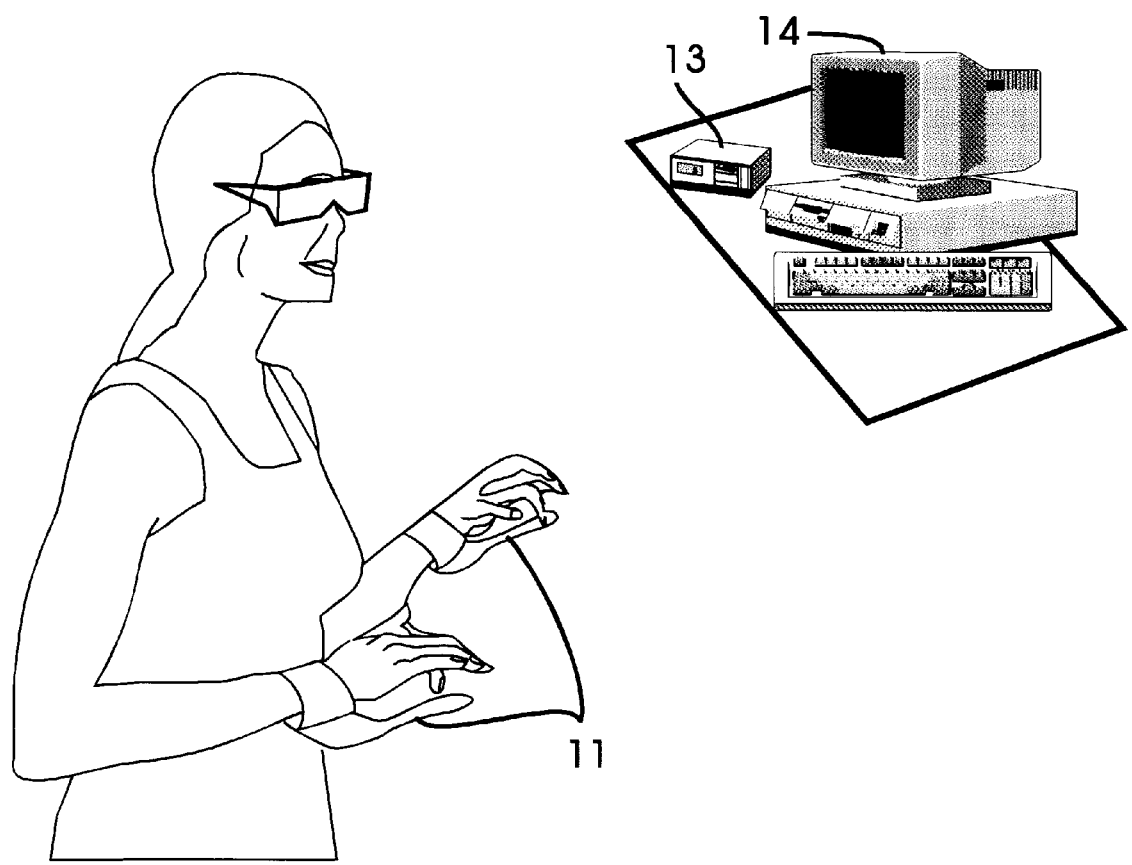
FIG. 11 is an illustration of the head mounted display option.

The wrist-pendant optical keyboard system 10 according to the present invention, as shown in FIG. 1, comprises a multiple media sensor array processor with a radio transmitter 11 secured to each wrist of the operator 12, and a base station 13 connected to the host system 14. An optional head mounted display illustrated in FIG. 11 provides visual feedback for remote operation. The operator moves the selected pointing hand, stimulating the inertial detector system to issue cursor movement commands. The operator's fingers are individually extended downward entering the optical plane below the palm illuminated by the infrared emitters 16 and the resulting reflection activates a single phototransistor in the detector array 15. Beam reflection is illustrated in FIG. 6. The sensor array processor distinguishes a key closure and generates a standard keyboard scan code. Pointing commands, keyboard scan codes and audio signals received by a microphone and digitized in the wrist unit are optionally multiplexed for radio or wireless or digital transmission to the base station where they are passed onto the host system. Each hand operates half the "qwerty" keyboard in the traditional fashion, but "air typing" is optically detected by the device in lieu of (and optionally in addition to) physical key depression. The valid key cells 52 are defined by the optical beam paths as shown in FIG. 7.

Figure 9:
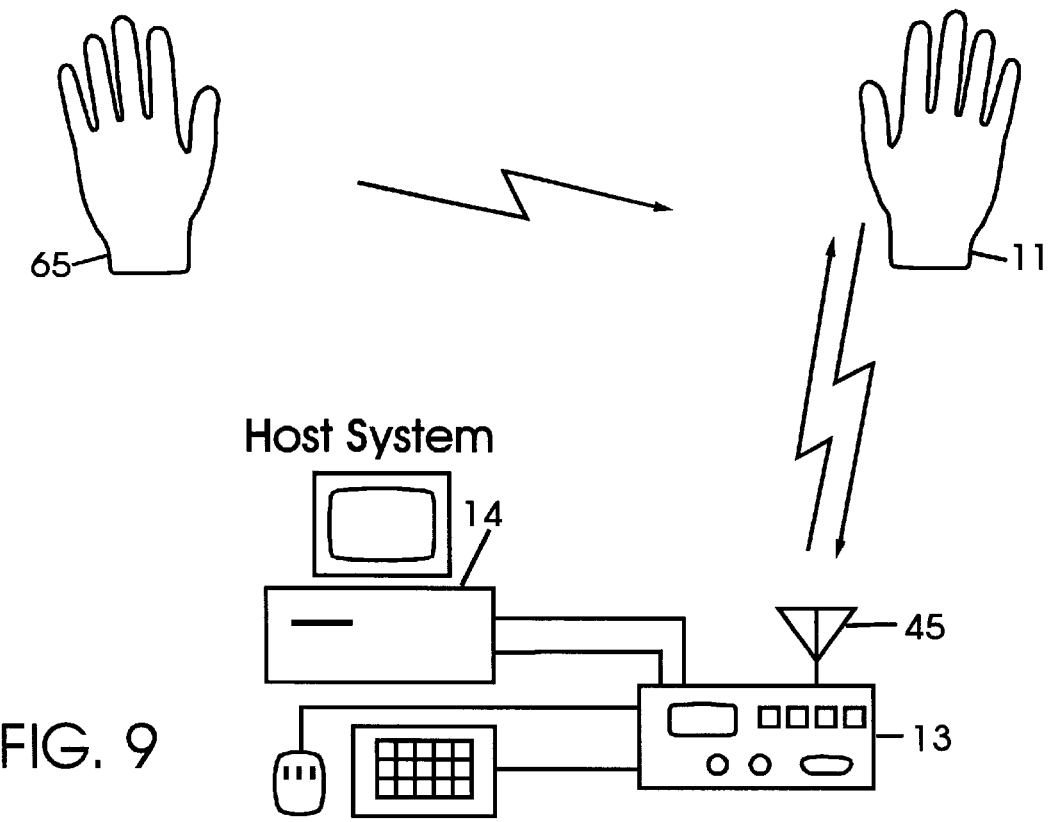
FIG. 9 is a signal flow chart of the simplex configuration.
Figure 10:
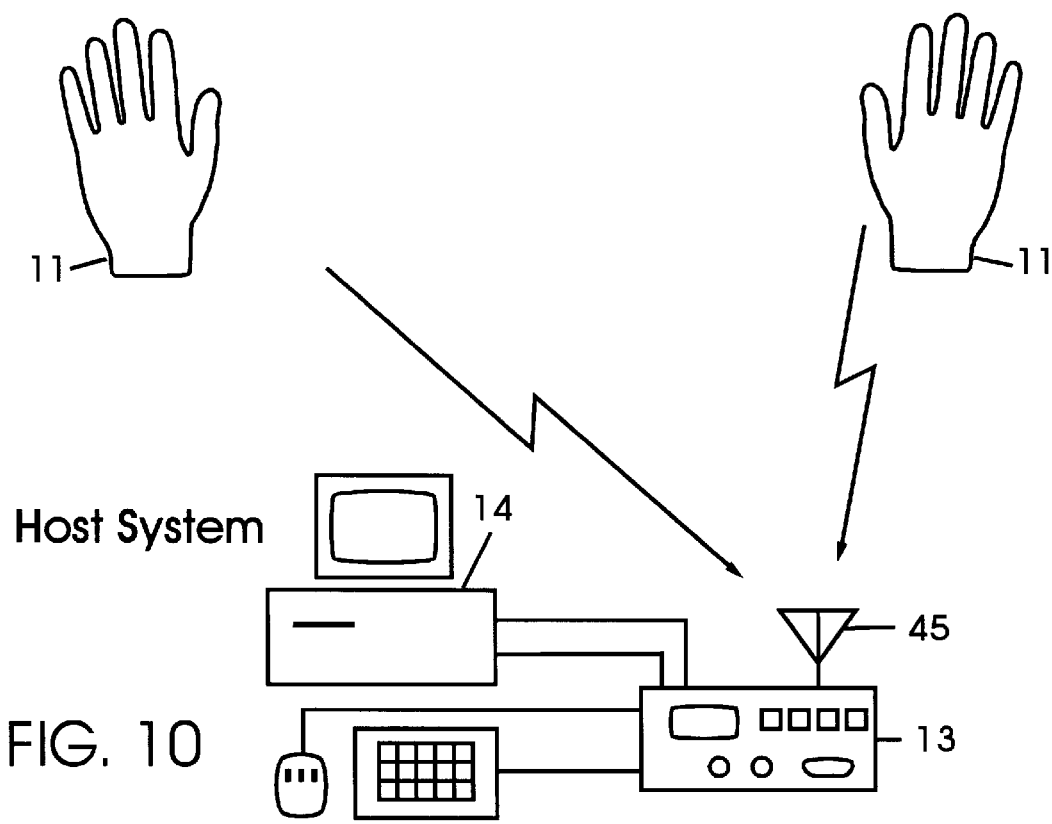
FIG. 10 is a signal flow chart of the full duplex master/slave configuration.

The system is configured appropriately for the specific application, and the most flexible implementation uses the master/slave configuration depicted in FIG. 9. This allows the slave wrist device 65 to utilize a low power transmitter, such as a standard simplex transmitter at a low data rate for communication to the master wrist device 11. The more demanding spread spectrum transceiver link passes keyboard information from both wrist devices in addition to pointing device and audio signals to and from the base station. Alternatively, each wrist device may utilize a simplex link directly to the base station as shown in FIG. 10, for applications where, for example, all feedback is received from the base station and host system. This provides local mobility and freedom of arm position where remote operation is not required. Master/slave operation is described herein since simplex operation is a subtractive derivative thereof.

Figure 2:
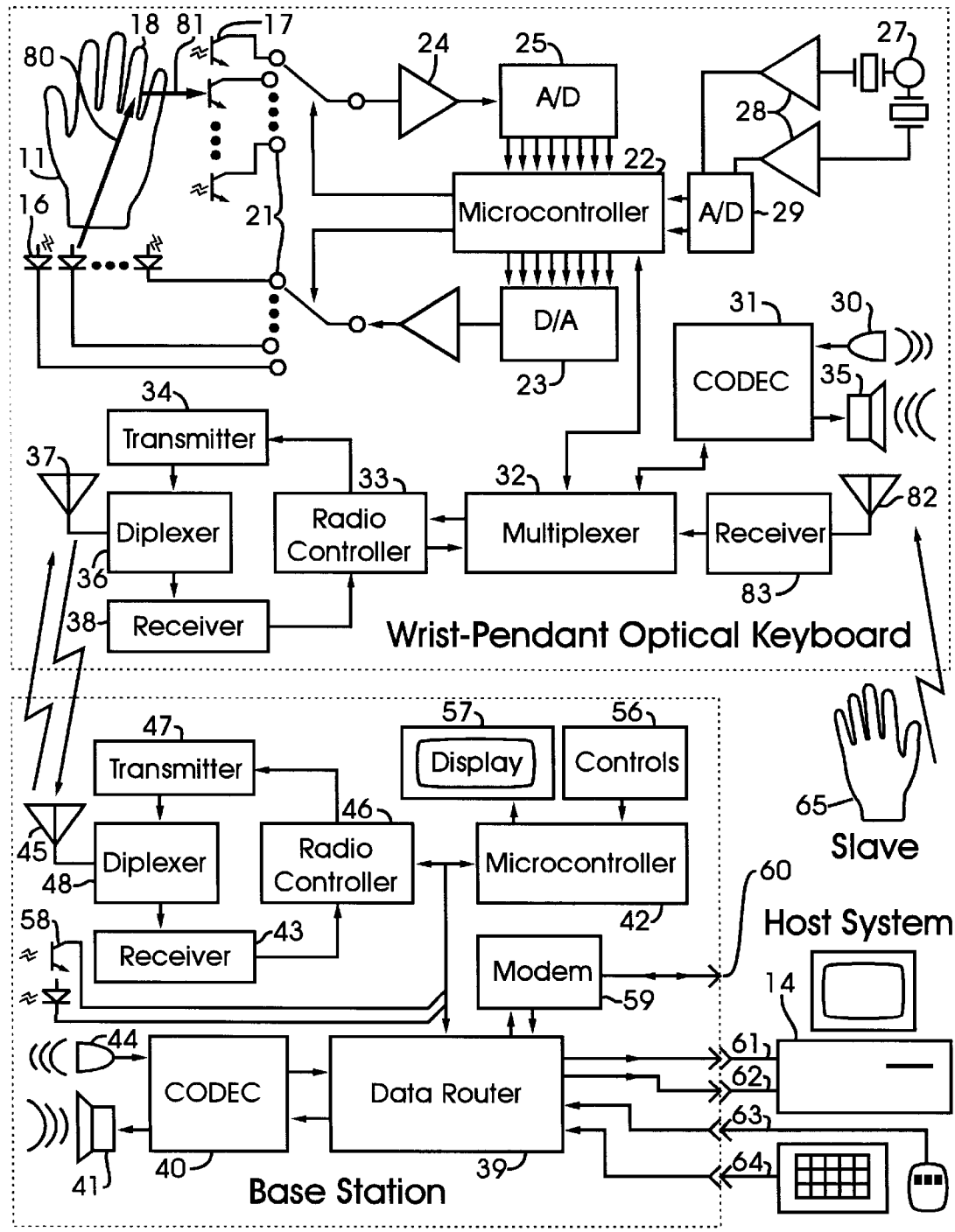
FIG. 2 is a block level schematic diagram of the system.

A block diagram level schematic in FIG. 2 illustrates the signal flow through the system. Each optical sensor matrix consists of substantially orthogonal, non-orthogonal, or substantially coplanar arrays or components of arrays of narrow beamwidth infrared emitters (for example, diodes or other light emitting sources) 16 and detectors (for example, phototransistors) 17. Emitters, for example, issue columns in the matrix and detectors receive rows. When a digit (finger) 18 or other obstruction enters the plane of the matrix, an emitter beam 80 is reflected 81 toward a detector. Infrared emitters and detectors are selected such that they produce an optical matrix similar in geometry to that of the standard computer keyboard or piano keyboard, e.g. key cells on 0.75" centers for a computer keyboard and 0.9" centers for a piano keyboard. This implementation utilizes devices with a lens structure presenting, for example, 10 degree nominal beamwidth emitters and 18 degree nominal beamwidth detectors. Both arrays are mounted behind a spring steel band 20 with holes the size of the device lenses such that the lenses protrude through the holes.

Figure 3:
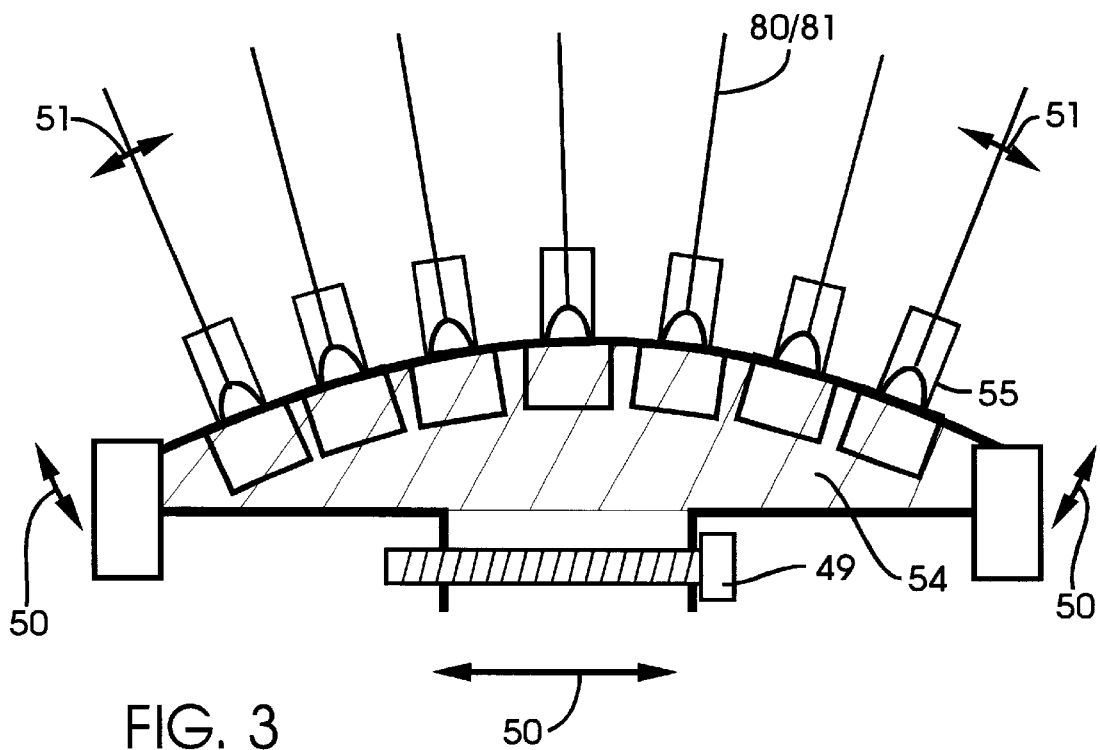
FIG. 3 is an illustration of the adjustable mounting scheme for the emitter and detector arrays.

The mounting configuration is illustrated in FIG. 3. The arrays are optionally optically shielded with opaque shrouds 54 around the device body side of the mounting bands to isolate the optical paths from ambient light. Each lens is further optionally shielded with a light absorbent opaque tube 55 surrounding the lens and extending beyond the end of the lens to block light entering beyond the beamwidth angle intended for operation. Ideally, the narrow beamwidth devices in conjunction with the optical shields prevent ambient light from impinging on the photodetectors when a finger enters the key cell since the photodetector lens falls in the ambient light's shadow cast by either the finger or the surrounding optical shield. Only the intended emitter reflection is detected during key closure or substantial key closure.

Figure 4:
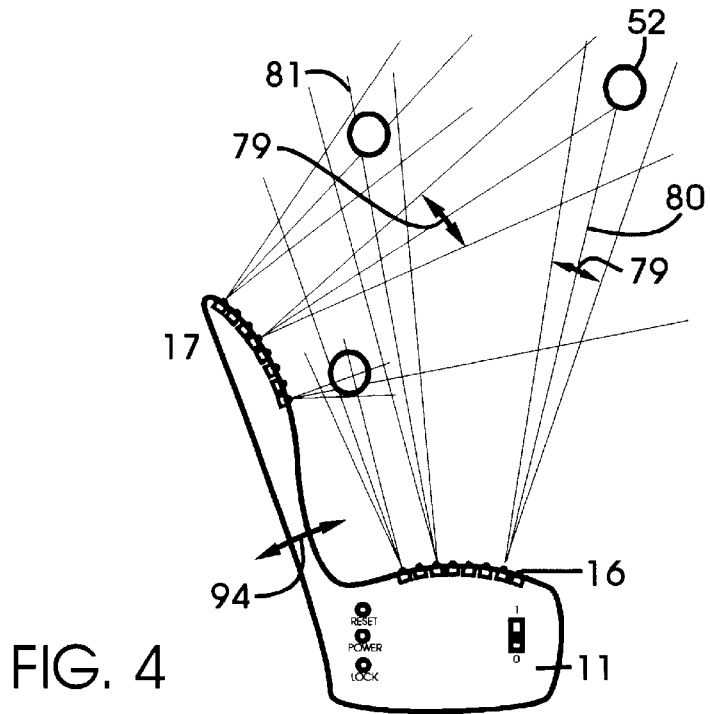
FIG. 4 is a pictorial representation of the optical beam geometry.

The geometry of the optical path is depicted in FIG. 4. The center of the matrix is located approximately 4.3" from the center line of the emitter array, and 2.3" from the center line of the detector array to yield a 0.75" optical grid. Other standard optical grids and/or sized grids may be used. The grid is adjustable by the user, for example, both vertically and horizontally, to vary column and row spacing, respectively. The detector platform is optionally mounted on a boom arm 19 which may swivel inward or outward 94 to relocate the optical cell matrix. This adjustment is mechanically constrained so as to keep the detector array in substantially the same plane as the emitter array. Optical grid adjustment is accomplished by means of rotating a set screw 49, which deforms the flexible mounting band 50 by moving the optical array mounting brackets 53, to fan the optical rays outward or inward 51, depending upon the direction of rotation. Other standard methods of adjustment may also be used.

The geometric position of the detector array 17 with respect to the emitter array 16 forms a non-orthogonal, irregular 2-dimensional coordinate system where columns, defined by, for example, the emitter optical beam rays 80, each present a vector component 81a of the reflected beam 81 into the detectors 17, which is generally at an angle with the emitter optical beam rays 80, as depicted in FIGS. 5a–5b. This reflected beam 81 form the basis for the 2-dimensional matrix. Each emitter optical ray intersects each detector optical ray with a sufficient orthogonal vector component to define a unique coordinate pair (emitter, detector) distinct to that geometric location. Thus, the substantially non-perpendicular optical rays intersect to form unique ordered pairs corresponding to only one emitter and one detector or at least one emitter/detector combination (e.g., redundant emitter/detector combinations may also be provided). In this fashion, an irregular 2-dimensional grid is constructed while preserving the compact form factor afforded by closely spaced optical components in conveniently oriented arrays. Due to the radial geometry, the optical rays projecting from a given array are not parallel to one another, and the coordinate system defined does not readily project into a rectangular coordinate system. The radial geometry of the optical beam rays, in conjunction with the beamwidth divergence as a function of radial distance for both emitter and detector, necessitate the selective use of beam intersections for valid optical matrix cells.

The radial emitter array is designed such that the optical beams present a geometry similar to that of the metacarpals as they project from the wrist. By converging these column rays at the wrist in a fan geometry, a more natural coordinate system is formed which corresponds to the position of the digits (fingers). The detector array geometry is selected to mount the devices together as close to the wrist device as practical. In this fashion, an ergonomic matrix is constructed from two radial arrays oriented at an oblique angle to one another. A representative scheme is illustrated in FIG. 7.

The matrix is scanned by stimulating a selected emitter and evaluating the waveform of a selected detector. Electronic switches 21 selecting the emitter and detector are activated by the wrist device's microcontroller 22 or other suitable controller. The selected emitter is energized with, for example, a raised cosine current pulse generated in the digital to analog converter 23 as synchronized by the microcontroller. Each detector in a row is sequentially sampled while a column is repetitively stimulated, and the next column in the matrix is selected upon completion of a row. The selected detector signal is optionally amplified in an AC coupled amplifier 24 to reject steady illumination of the detector by ambient light sources. It may also be desirable to bandpass filter the signal to further reject non-correlated ambient signals.

The filtered, amplified signal is then digitized by an analog to digital converter 25 and latched into the microcontroller for digital signal processing. The signal is correlated, for example, against the emitter stimulus waveform (raised cosine) and a signal to noise ratio is measured and logged in the microcontroller. The optional use of a sinusoidal stimulus allows operation at the highest frequency possible for the infrared emitter while minimizing undesirable electromagnetic radiation caused by the high current used to generate sufficient illumination to detect reflections in extreme use environments. A correlation index is optionally tallied for each matrix pair based upon analysis of the recorded signal to noise measurements. Correlation above a set threshold indicates key closure for that pair. If more than one matrix pair in a local area of adjacent cells register closure then the pair with the greatest correlation index is selected for nomination for recognition. The process is repeated to verify intentional input and the confirmed closure is then transmitted to the host system for processing. The emitters are individually pulsed with three cycles of a raised cosine wave while a selected detector is sampled and the waveforms are correlated against the emitter waveform to determine key closure(s).

The optical cells furthest from the emitter and detector sensor arrays suffer significantly greater optical attenuation than those cells closest to the origin of the optical plane due beam spreading 79 on the longer optical ray paths. This effect is evident in the comparative cell sizes shown in FIG. 4. This is exacerbated by reduced shadowing of unintended amibient illumination in the furthest cells since the finger width subtends a smaller angle to the detector at a greater distance. The angle is seen to be a function of the width of the finger width and the distance from the detector device as shown in FIG. 5. Angle θ=2α is determined by solving the right triangle with legs a and b:

$$\alpha = \tan^{-1}(b/a).$$

Calculating obstruction angles θ for the optical cells nearest to, and farthest from the optical plane origin using representative distances cited in the example above is instructive. Let us assume for this example, that the pinky finger which is used in the innermost cell, measures 0.60" in diameter and the index finger which is used the outermost cell, measures 0.75" in diameter. Furthermore, the innermost cell measures 3" from the emitter and 0.60" from the detector, and the outermost cell measures 6.1" from the emitter and 5.1" from the detector, the following table is generated.

|  | Pinky | Index | Beamwidth |
| --- | --- | --- | --- |
| Emitter | 28° | 7.0° | 10° |
| Detector | 52° | 6.8° | 18° |
| Finger Dia. | 0.60" | 0.75" | |

Both angles for the pinky finger are seen to extend well beyond the device beamwidth which is advantageous. The emitter optical energy is entirely directed onto the surface of the finger, and therefore available for reflection to the detector. Likewise the effective detector beamwidth of 18° is completely covered by the finger's effective angle of 52°, presenting a full field of reflective surface and complete shadowing of direct ambient optical rays. The index finger presents a 7.0° angle to the emitter, and only half that reflects the beam toward the detector, (the other half reflects away from the detector array). This introduces an optical loss mechanism. Of primary concern, though, is the index finger measured at the detector. This presents a 6.8° angle which is well under the device's 18° beamwidth. Direct beams of ambient light may impinge upon the lens of the detector device under these circumstances.

Conversely, we may calculate the distance a for which the index finger completely covers the detector effective beamwidth. The representative 0.75" dia. index finger is large enough to obscure the detector if it is less than 2.4" from the detector device. This is approximately in the middle of the hand in the optical plane, hence half the cells in the example offer imperfect shadowing. Further analysis reveals that the detector beam must be constricted to 8° to allow the entire optical plane to afford complete shadowing for all cells. The simple technique of using a narrow diameter tube with appropriate dimensions provides a lossy method for such constriction, and a lens arrangement which focuses the divergent beam into a column provides an essentially lossless alternative. Of course, other configurations, beam widths and/or angles may also be used in the present invention, so long as the desired illuminating, reflecting and detecting functions may be accomplished.

Additionally, the pulse correlation technique is useful to reliably detect key closure in the presence of strong ambient illumination or electromagnetic interference signals. The dynamic range of optical sensitivity is adjustable in software as the gain of the detector amplifier 24 is digitally programmable by the microcontroller 22. When properly adjusted for the environment, the intended reflection waveform is superimposed on any unintentional ambient illumination leakage as well as ambient illumination of the finger on the surface exposed to the detector, resulting in accurate correlation under both extremes of optical ray path distance in the optical plane.

Multiple simultaneous closures of nonadjacent cells may be permitted for certain implementations, but only a single cell in each row and and a single cell in each column is recognized since any additional obstructions in the optical path will fall in the shadow of the closest digit. Continuous actuation of any key is recognized in an "n-key rollover" algorithm and translated as multiple sequential actuations in the standard fashion.

Figure 12:
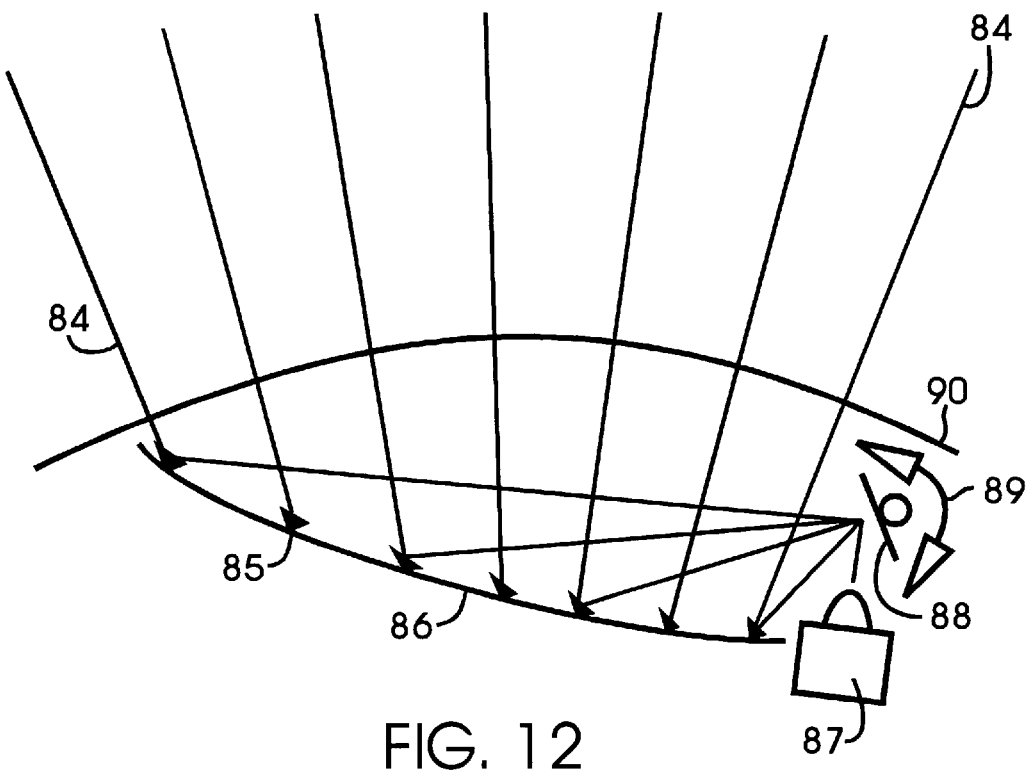
FIG. 12 is an illustration of the laser's optical beam geometry.

The optical emitters may be replaced by lasers to provide high intensity, collimated column illumination for applications where the infrared emitting diode intensity is insufficient to overcome ray distance path loss or reflective surface absorption (e.g. for use with certain gloves or in hostile environments including underwater or gaseous or smoky environments). A representative drawing of the laser components is depicted FIG. 12. In this implementation the laser beam 84 is diffused and optionally spread with concave reflective lenses 85 in order to increase the spot size on the finger so as to detect the entire optical cell area without leaving "dead spots" devoid of intentional laser beam illumination. Columns nearer the origin require more spreading than those furthest from the origin due to the longer optical path; hence the columns ideally require different shaped reflective lenses. The laser beam generated in, for example, a solid state semiconductor laser device 87, is stepped from one column to the next 89 with a servo mechanism attached to a pivoting reflector 88. The reflective lenses are integral to, or mounted to the lens array bracket 86. The wavelength of the laser beam may be selected appropriately for the environmental absorption and must be matched to the photodetector selected. The potential optical hazard of lasers must be accounted for in these applications. The remainder of the system operates identically to that disclosed herein.

Figure 13:
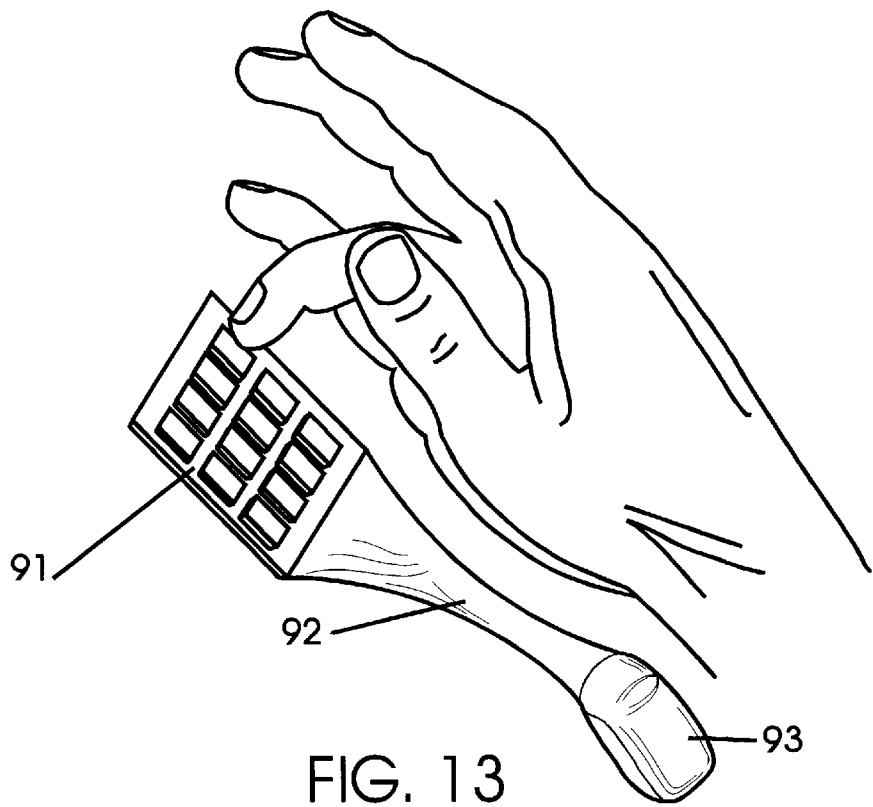
FIG. 13 is an illustration of the physical keypad.

In certain applications it may be desirable or necessary to utilize a physical keypad 91 as shown in FIG. 13 in lieu of, or in addition to, the optical reflectance matrix described above. This alternative embodiment may be implemented using the standard keyswitch, mechanically actuated keyboard, or optical beam interruption approach. Advantageously, in this application, keypad 91 is removably securable to, for example, the user's wrist, and is designed to be substantially portable with the wrist. This offers the advantages of reduced power consumption for keyswitch matrix or optical beam interruption versus optical beam reflectance. In addition, the tactile feedback received when the operator's fingertip touches the backplate (or keyswitch) provides immediate confirmation of key closure and may allow higher input rates, as it more closely resembles traditional touch typing. The obvious drawback is the size and weight of the keypad attached to each wrist device.

The keypad is thus made retractable on a narrow mechanical boom 92, using for example, a telescoping device, to facilitate stowage adjacent to the wrist device 93 without removing the device from the wrist when actual keyboard input is not required. The same optical system components are used for the physical keypad optical beam interruption as are used for the reflectance model, except that the detectors are located in substantially linear or non-intersecting arrays opposing linear or non-intersecting arrays of emitters, and two sets of emitter/detector arrays are used: one for columns and one for rows. A thin, optically absorptive, rigid plate is affixed underneath the optical matrix providing a stop for fingers during key actuation. The keypad is securable to the wrist using, for example, a standard suitable strap or strapping mechanism. Apart from the keypads themselves, the remainder of the system operates identically to that of the optical reflectance solution described above. Advantageously, the portable aspects of keyboard 91 with wrist device 93 provide the user flexibility to transport the keyboard to any suitable location in space or onto any surface.

Left, right, up and down direction keys in the key matrix are selectable with a special shifted configuration to generate pointing commands without implementing the hardware pointing device. For applications requiring the pointing device, motion of the pointing hand is detected in a standard two dimensional piezoelectric accelerometer 27 whose signals are amplified 28 and digitized 29 and stored in the microcontroller. These waveforms are digitally processed to yield equivalent motion signals (velocity vectors) which are analyzed to produce pointing commands in standard mouse or joystick format. An example using cantilever type piezoceramic transducers 67 is presented in FIG. 8a. The mass of the ceramic element imposes a shear force 66 distributed along the element when the end constrained by the cantilever mount 69 is accelerated normal to the face of the element. The cantilever mounts are rigidly affixed to the mounting base 70, which is integral to the wrist device's chassis case 90. The resulting motion impresses opposite charges on the piezoelectric element electrodes 68. These charges are conducted down short electrode wires 71 to extremely high impedance charge amplifiers 28 where they are converted to voltage waveforms and digitized in the A/D converter 29.

Figure 8:
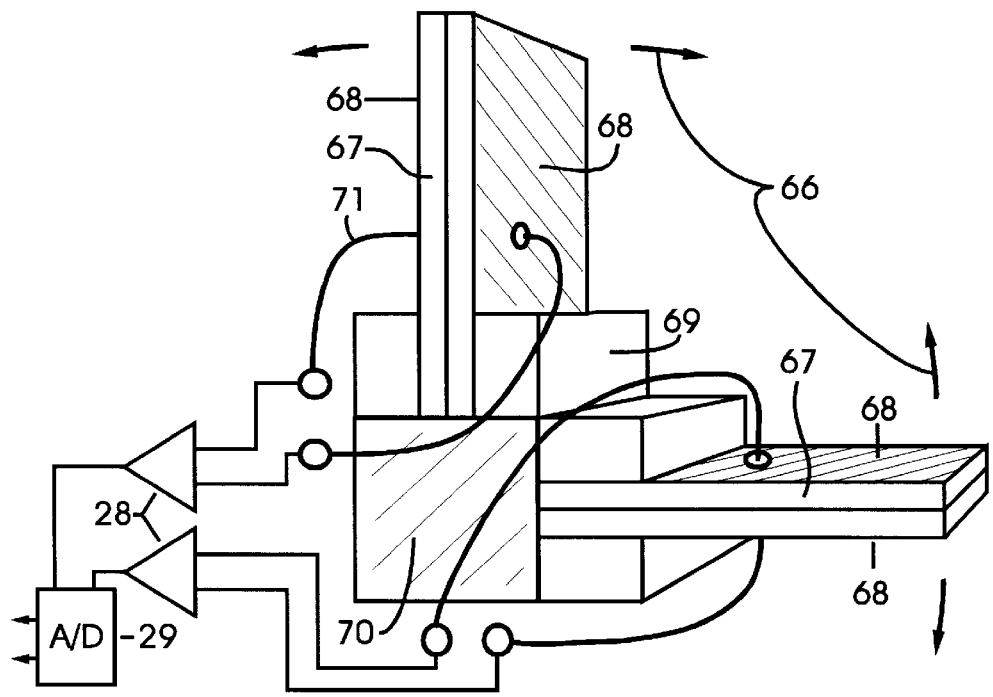
FIGS. 8a–8b are diagrams of the inertial reference sensor array.
Figure 8:
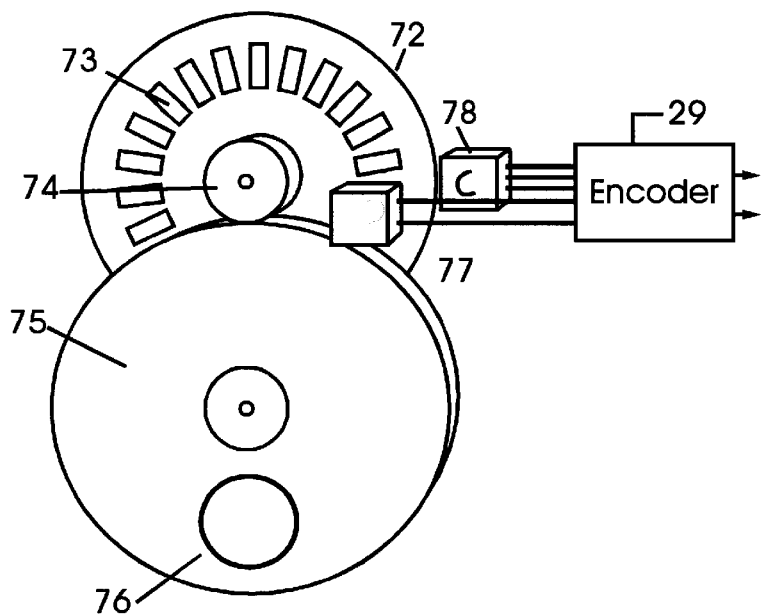

Alternatively, an eccentric weighted, slotted disc 72 forms a rigid pendulum which rotates as the angle of the hand is moved referenced to the earth's gravitational field, as illustrated in FIG. 8b. A weight 76 rotates the gravity sensor disc 75, in response to a tilt in the axis of rotation, which causes the slotted disc roller wheel 74 to rotate the slotted disc. This method is well known as the standard computer mouse roller ball detection mechanism. The angular displacement is measured with pulses generated as the slots 73 interrupt an optical beam generated by an LED 77 and detected by a dual phototransistor 78 which issues phased pulse sequences determining motion rate and direction. These pulses are encoded in the standard mouse format in the encoder 29. The pointing device command is incremented or decremented accordingly. Two such sensors are orthogonally oriented to generate two dimensional pointing device commands.

Optionally, pointing devices active on at least each wrist device may be encoded to distinguish at least two distinct pointing signals for transmission to the base station. In this application, the base station decodes and routes the two pointing signals to the appropriate host port(s). The host system is configured to accept at least two distinct pointing device inputs. This may be used, for example, to individually control any combination of at least two separate controls in the host system, including cursors, a dedicated pulldown menu navigator and/or a parametric control signal.

Acoustic signals are transduced to electrical waveforms in the microphone 30 which are digitized in the standard Pulse Coded Modulator (PCM) coder/decoder (CODEC) 31.

The serial digital data stream is multiplexed with the keyboard scan codes and the pointing device commands in the standard multiplexer 32. The multiplexer sends the serial bitstream into the radio controller 33 for suitable processing before radio frequency modulation in the transmitter 34. Signal conditioning may include spectral whitening or data format encoding, e.g. return to zero or run length limited format, etc. depending upon the radio transmission type used. Forward error correction may be included. The radio signal is converted to direct sequence spread spectrum by means of pseudorandom number generation which is logically exclusive-OR'ed with the serial bitstream. Spread spectrum radio transmission offers the advantages of code division multiple access (CDMA) which is more spectrally efficient, improved interference immunity and permits higher unlicensed transmitter power levels. As indicated above, other types of transmission methods and/or encoding methods and/or compression methods may be used.

The final serial bitstream is coupled into the radio transmitter 34 where it is, for example, modulated onto an appropriate radio frequency sinewave carrier and upconverted to the desired frequency band. This implementation uses binary phase shift keying modulation upconverted to 2.44 GHz for use in the unlicensed CFR (FCC) Part 15.245 ISM band. Of course, only appropriate radio frequencies may be used. (Further, digital implementation of the present invention is an alternative embodiment, or any other wireless implementation is also possible.) The filtered RF signal is amplified in the transmitter and fed through a diplexer 36 to the antenna 37. The diplexer essentially prevents the high level transmitted signal from leaking into the sensitive radio receiver 38. The antenna broadcasts the resulting downlink signal to the base station. Other standard transmitters and/or antennas may also be used.

The radio frequency broadcast signal is received at the base station antenna 45, then separated in the diplexer 48 and sent to the radio receiver 43 where it is boosted in a low noise amplifier and then passed to a downconverter where it is translated down to the first intermediate frequency (IF). The first IF signal is amplified and filtered before being split into two identical signals which are sent to the left and right channel radio receivers. Each signal is again amplified and downconverted to the respective second IF. These signals are tuned to the appropriate channel within the IF band and de-spread with the channel's synchronized pseudorandom code in a bi-phase demodulator. The recovered baseband waveform is amplified and converted to a serial bitstream which is identical to that transmitted from each wrist device's transmitter. This received serial bitstream may optionally be generated using standard radio, digital and/or wireless receiver equipment.

The resulting serial bitstream is sent to the data router 39 where it is demultiplexed into standard keyboard scancodes, pointing device or parametric control commands and the PCM audio bitstream. The optional audio bitstream is fed directly into the CODEC 40 and converted to an analog audio waveform and then to speaker 41. The keyboard scancodes and pointing device or parametric control data are sent to the appropriate I/O port connected to the host system, and to the microcontroller 42 where they are directed to the base station display. Input commands from the host system's existing keyboard and pointing device (mouse, joystick or digitizing pad) are received in the data router 39 where they are passed to the host, interleaved with the wrist-pendant device input or other compact or substantially portable device input.

The base station microphone 44 transduces local sound (voice, music, etc.) into an analog electrical signal which is amplified and digitized in the CODEC 40 and then sent to the data router where it is multiplexed with base station commands and host system keyboard and pointing device feedback for transmission back to the wrist-pendant devices. This serial bitstream is fed into the base station radio controller 46 where it is conditioned and spread for radio frequency conversion in the transmitter 47. The signal is modulated, upconverted, filtered and amplified in an identical process to that performed in the wrist-pendant devices. The RF signal is fed into the diplexer 48 where it is similarly isolated from the extremely sensitive receiver circuitry, and sent to the antenna for broadcast to the wrist-pendant units.

In addition to broadcasting the downlink radio signal, each wrist-pendant unit's antenna 37 also receives the uplink radio frequency signal from the base station in a different frequency band from that of the downlink. This implementation utilizes the 915 MHz FCC Part 15.245 ISM band for the uplink. Other code frequencies or wireless frequencies may also be used. The remote unit's antenna presents the signal to a low noise amplifier where it is boosted for downconversion to the IF in the receiver 38. The received signal is detected by a BPSK demodulator and synchronized within the radio controller 33 to the base station transmitter, and amplified and digitized into a serial bitstream. The received bitstream is demultiplexed in the multiplexer 32 into the audio signal which is routed to the CODEC 31, and the keyboard and pointing device feedback codes, and the wrist-pendant device control commands which are routed to the microcontroller 22. Audio output is amplified and transduced to sound in the speaker 35. Keyboard and pointing device feedback codes are analyzed to confirm receipt of transmitted data and control commands verify system link integrity.

In the master slave configuration, the master wrist device receives the data input from the slave device via a low data rate radio channel. This signal is collected at the antenna 82 and downconverted in the receiver 83. The implementation cited herein utilizes a narrowband FSK scheme at 49.85 MHz providing 2400 baud key closure data only.

The base station control keys 56 navigate the operator through a system of standard pull down menus presented on the display 57 which prompt the operator to review and manually adjust system configuration parameters. Manual setup is generally not required as the system optionally automatically calibrates the radio channels and system configuration parameters and scans the appropriate RF band, acquires the remote wrist-pendant units and interrogates their configuration and status upon engaging power to the system. Various configurations may be stored in nonvolatile memory located in each wrist-pendant device and the base station, and recalled and changed as required. System diagnostic tools are available to aid in troubleshooting problems and optimize subsystem performance.

The base station includes in the front panel one infrared emitter and one photodetector of the same wavelength as those used in the wrist devices. This constitutes a duplex communication port 58 used to transfer configuration data prior to acquisition of the radio link between the wrist device and the base station. It is useful for dynamic reconfiguration to a different code, frequency band or system setup. An optional uplink mode is selectable in the wrist device which deactivates the optical matrix scanning and alternately selects one emitter and one detector to synchronize with the base station port and exchange messages and handshakes. New configuration setups may be stored both in the wrist device and the base station.

The optional telephone modem 59 may be employed to directly interface from the wrist device through the base station telco connector 60 to the public switched telephone network. Appropriate regulatory approvals (e.g. FCC Part 68 in the U.S.) must be obtained for any hardware device connecting to the public switched telephone network. This option permits voice and data to be transmitted anywhere in the world.

The implementation exemplified herein depicts a flexible system permitting use of the existing host peripherals (mouse and keyboard) in addition to the wrist device's input. In this configuration, the base station offers input ports for the keyboard 64 and mouse 63, and output ports for the keyboard 62 and mouse 61. The host may be accessed from the original keyboard and mouse instead of, or in addition to the wrist device, providing a convenient override and augmentation function.

The forgoing description is considered as illustrative only of the principles of the invention. Furthermore, since numerous modifications and changes will readily occur to those skilled in the art, it is not desired to limit the invention to the exact operation and construction shown and described, and accordingly all suitable modifications and equivalents may be considered within the scope of the invention as defined by the claims below.

The embodiments of the invention in which an exclusive property or privelidge are claimed is defined as follows:

What is claimed is:

1. A method of detecting at least one of a presence and absence of a human digit or prosthetic appendage of a wrist or other suitable appendage of a user within a specific temporal region defined in fixed relation to the wrist or other suitable appendage, comprising the steps of:
    (a) defining a plane in which an array of optical sources affixed to the wrist direct narrow light beams intersectable angles to an array of substantially narrow beamwidth optical detectors positioned at in fixed relation to the optical sources producing a matrix;
    (b) individually exciting each of the optical sources with a distinct waveform and respectively independently detecting by each of the optical detectors responsive thereto as detected waveforms;
    (c) evaluating each of the detected waveforms for correlation with each of the distinct waveforms to determine at least one of a presence and absence of a reflection of the distinct waveforms, and producing correlation results responsive thereto;
    (d) analyzing the correlation results for each of the optical detectors and the optical sources respectively, within the matrix to determine at least one valid key closure; and
    (e) encoding the at least one valid key closure into at least one standard computer keyboard scancode.

2. The method of claim 1, wherein said encoding step (e) further comprises the step of encoding the at least one valid key closure into the at least one standard computer keyboard scancode comprising at least one standard computer musical instrument digital interface (MIDI) command code.

3. The method of claim 1, further comprising the steps of:
    (f) detecting motion in three dimensional space of the wrist device by determining real-time acceleration vectors using an array of accelerometers in fixed position within the wrist device; and
    (g) mathematically integrating the acceleration vectors producing three dimensional velocity vectors; and
    (h) encoding the velocity vectors into pointing device commands comprising at least one of standard computer mouse and joystick formats.

4. The method of claim 3, wherein said encoding step (h) further comprises the step of encoding the velocity vectors into parametric control level changes.

5. The method of claim 1, further comprising the step of receiving local acoustic audio waveforms using at least one of a microphone, amplification and digital encoding circuitry.

6. The method of claim 1, further comprising the step of multiplexing the at least one standard computer keyboard scancodes into a multiplexed signal, and transmitting the multiplexed signal over a wireless link to a base station.

7. The method of claim 1, further comprising the steps of:
    (f) multiplexing at least one of the standard computer keyboard scancode, a musical instrument digital interface (MIDI) command code, a parametric control command, and a digital audio waveform into a multiplexed signal;
    (g) transmitting the multiplexed signal over a wireless link to a base station;
    (h) receiving the multiplexed signal and demultiplexing the multiplexed signal for appropriate routing to a host system; and
    (i) transmitting over another wireless link command and control codes, input confirmation, configuration and operating parameters, and optionally digital audio communications data to the wrist device.

8. The method of claim 1, wherein said defining step (a) further comprises the step of defining the plane in which the array of optical sources affixed to the wrist directs narrow light beams of less than 20 degree beam angles at the intersectable angles to the array of the substantially narrow beamwidth optical detectors.

9. The method of claim 1, further comprising the step of detecting at least one of hand motion and tilt in three dimensional space of the wrist device by determining real-time acceleration vectors using an array of acelerometers to free the fingers for typing and mouse key, alphanumeric key and function key closure while moving a cursor.

10. A method of detecting at least one of a presence and absence of at least one human digit on a wrist of a user within a specific temporal region defined in fixed relation to the wrist, comprising the steps of:
    (a) illuminating a plurality of first light beams via a plurality of optical sources affixed to the wrist in a first position respectively in a first direction and remote from or not disposed on the at least one human digit;
    (b) reflecting a plurality of second light beams via at least one intersection between at least one of the first light beams and the at least one human digit in a second direction, each of the plurality of second light beams having at least one component;
    (c) detecting the at least one component via at least one of a plurality of optical detectors affixed to the wrist in a second position responsive thereto as at least one detected light beam and remote from or not disposed on the at least one human digit;
    (d) evaluating the at least one detected light beam to determine at least one of a presence and absence of a reflection of the plurality of second light beams, and producing correlation results responsive thereto; and
    (e) generating at least one activation signal responsive to the correlation results indicative of the at least one of the presence and absence of the at least one human digit on the wrist of the user within the specific temporal region.

11. The method of claim 10, further comprising the step of arranging at least one of the plurality of optical sources and the plurality of optical detectors in an array geometry in a form of a hand, the array geometry comprising a fan shape aligning with carpal bones in the hand.

12. The method of claim 10, wherein the plurality of optical sources and the plurality of optical detectors comprise narrow beamwidth optical emitters and detectors, respectively.

13. The method of claim 10, further comprising the step of detecting at least one of hand motion and tilt in three dimensional space of the wrist device by determining realtime acceleration vectors using an array of accelerometers to free the fingers for typing and mouse key, alphanumeric key or function key closure while moving a cursor.

14. A method of detecting at least one of a presence and absence of at least one human digit on a wrist of a user within a temporal region defined with respect to the wrist, comprising the steps of:
   (a) illuminating a plurality of first light beams in a first direction from a first position remote from or not disposed on the at least one human digit;
   (b) reflecting a plurality of second light beams via at least one intersection between at least one of the first light beams and the at least one human digit in a second direction, each of the plurality of second light beams having at least one component;
   (c) detecting the at least one component of the at least one intersection responsive thereto as at least one detected light beam from a second position remote from or not disposed on the at least one human digit;
   (d) evaluating the at least one detected light beam to determine at least one of a presence and absence of a reflection of the plurality of second light beams, and producing correlation results responsive thereto; and
   (e) generating at least one activation signal responsive to the correlation results indicative of the at least one of the presence and absence of the at least one human digit within the temporal region.

15. The method of claim 14, further comprising the step of arranging at least one of the plurality of optical sources and the plurality of optical detectors in an array geometry in a form of a hand, the array geometry comprising a fan shape aligning with carpal bones in the hand.

16. The method of claim 14, wherein the plurality of optical sources and the plurality of optical detectors comprise narrow beamwidth optical emitters and detectors, respectively.

17. The method of claim 14, further comprising the step of detecting at least one of hand motion and tilt in three dimensional space of the wrist device by determining realtime acceleration vectors using an array of accelerometers to free the fingers for typing and mouse key, alphanumeric key or function key closure while moving a cursor.

18. A system of detecting at least one of a presence and absence of at least one human digit on a wrist of a user within a temporal region defined with respect to the wrist, comprising:
   a wrist assembly removably connectable to the wrist of the user;
   a plurality of optical sources disposed on a first location of said wrist assembly, and illuminating first light beams in a first direction, the first direction capable of intersecting with the at least one human digit, thereby reflecting at least one second light beam via at least one intersection between at least one of the first light beams and the at least one human digit in a second direction, the at least one second light beam having at least one component;
   a plurality of optical detectors disposed on a second location of said wrist assembly, and detecting the at least one component of the at least one intersection responsive thereto as at least one detected light beam; and
   a data processor adapted to be connected to said plurality of optical detectors, receiving and evaluating the at least one detected light beam to determine at least one of the presence and absence of a reflection of the at least one second light beam, and generating at least one activation signal responsive thereto indicative of the at least one of the presence and absence of the at least one human digit within the temporal region.

19. A system according to claim 18, wherein said data processor is connected to said plurality of optical detectors via at least one of hard wiring and wireless connection.

20. A system according to claim 18, wherein the at least one activation signal is used to control input of data into a computer system.

21. A system according to claim 18, wherein the at least one activation signal is used to control input of data for at least one of a character keyboard for input of characters, a joystick for input of joystick actions and a musical keyboard for input of musical actions.

22. A system of detecting at least one of a presence and absence of at least one human digit on a wrist of a user within a predetermined region defined with respect to the wrist, comprising:
   a wrist assembly removably connectable to the wrist of the user;
   a plurality of optical sources disposed on said wrist assembly, and illuminating first light beams in a first direction, the first direction capable of intersecting with the at least one human digit, thereby reflecting at least one second light beam via at least one intersection between at least one of the first light beams and the at least one human digit in a second direction, the at least one second light beam having at least one component;
   a plurality of optical detectors disposed on said wrist assembly, and detecting the at least one component of the at least one intersection responsive thereto as at least one detected light beam; and
   a data processor adapted to be connected to said plurality of optical detectors, receiving and evaluating the at least one detected light beam to determine at least one of a presence and absence of a reflection of the at least one second light beam, and generating at least one activation signal responsive thereto indicative of the at least one of the presence and absence of the at least one human digit within the predetermined region indicative of at least one predetermined input.

23. A system according to claim 22, further comprising another system removably connectable to another wrist of the user having at least another human digit,
   wherein said system is used to access the at least one predetermined input accessible to the at least one human digit, and said another system is used to access at least another predetermined input accessible to the at least another human digit.

24. A system according to claim 22, further comprising another system removably connectable to another wrist of the user having at least another human digit,
   wherein said system is used to access the at least one predetermined input accessible to the at least one human digit, and said another system is used to access at least another predetermined input accessible to the at least another human digit, wherein said system and said another system are communicable with each other, and wherein at least one of said system is optionally accessible to the at least another predetermined input, and said another system is optionally accessible to the at least one predetermined input, via a shift operation.

25. A method of detecting at least one of a presence and absence of at least one human digit on a wrist of a user within a specific temporal region defined in fixed relation to the wrist, comprising the steps of:

(a) illuminating a plurality of first light beams via a plurality of optical sources affixed to the wrist in a first position respectively in a first direction;

(b) reflecting a plurality of second light beams via at least one intersection between at least one of the first light beams and the at least one human digit in a second direction, each of the plurality of second light beams having at least one component;

(c) detecting the at least one component via at least one of a plurality of optical detectors affixed to the wrist in a second position responsive thereto as at least one detected light beam;

(d) evaluating the at least one detected light beam to determine at least one of a presence and absence of a reflection of the plurality of second light beams, and producing correlation results responsive thereto; and (e) generating at least one activation signal responsive to the correlation results indicative of the at least one of the presence and absence of the at least one human digit on the wrist of the user within the specific temporal region, wherein the plurality of optical sources and the plurality of optical detectors are at least one of retractable and collapsible.

26. A method of detecting at least one of a presence and absence of at least one human digit on a wrist of a user within a specific temporal region defined in fixed relation to the wrist, comprising the steps of:

(a) illuminating a plurality of first light beams via a plurality of optical sources affixed to the wrist in a first position respectively in a first direction;

(b) reflecting a plurality of second light beams via at least one intersection between at least one of the first light beams and the at least one human digit in a second direction, each of the plurality of second light beams having at least one component;

(c) detecting the at least one component via at least one of a plurality of optical detectors affixed to the wrist in a second position responsive thereto as at least one detected light beam;

(d) evaluating the at least one detected light beam to determine at least one of a presence and absence of a reflection of the plurality of second light beams, and producing correlation results responsive thereto; and (e) generating at least one activation signal responsive to the correlation results indicative of the at least one of the presence and absence of the at least one human digit on the wrist of the user within the specific temporal region, wherein the plurality of optical sources and the plurality of optical detectors are at least one of retractable and collapsible.

27. A system of detecting at least one of a presence and absence of at least one human digit on a wrist of a user within a predetermined region defined with respect to the wrist, comprising a wrist assembly having at least one emitter and at least one detector utilizing optical beam reflectance via reflectance of an emitted optical beam from the at least one emitter by the at least one human digit, wherein the at least one emitter and detector are remote from or not disposed on the at least one human digit and removably connectable to the wrist of the user, thereby defining a keyboard and providing the user with a logical keyboard portable with respect to the user and substantially fixed to said wrist via said wrist assembly.

* * * * *